United States Patent Office 3,726,877
Patented Apr. 10, 1973

3,726,877
AMINE SUBSTITUTED METHYLENE QUINUCLI-
DONE ANTI-BACTERIAL AGENTS
Samuel Elkin, Philadelphia, and Hillel Lieberman,
Andalusia, Pa., assignors to Temple University, Philadelphia, Pa.
No Drawing. Filed Oct. 28, 1970, Ser. No. 84,927
Int. Cl. C07d 39/06
U.S. Cl. 260—293.53    2 Claims

ABSTRACT OF THE DISCLOSURE

A wide variety of secondary and tertiary amine-substituted 2-methylene-3-quinuclidones constitute a new class of compounds which are useful as anti-bacterial agents.

This invention relates to the treatment of bacterial infections and more specifically to a new class of compounds having anti-bacterial properties.

Rapid strides have been made by medical science in the past several decades with the development of therapeutic compounds effective either to destroy or to inhibit the growth of bacteria and therefore useful in the treatment of bacterial infections. Because of the wide variety of such bacteria and the fact that all known anti-bacterial agents are limited in some way, such as with respect to effectiveness, undesirable side effects, and impaired or lack of effectiveness against certain specific types of bacteria, there remains the need for additional anti-bacterial agents.

It is therefore the general object of the present invention to provide such a new class of compounds which are useful as anti-bacterial agents.

Briefly, the present invention comprises the class of compounds consisting of secondary and tertiary amine-substituted 2-methylene-3-quinuclidones, otherwise referred to as Mannich bases of 3-quinuclidone. Such compounds are effective to inhibit the growth of many types of bacteria and may therefore be used to treat bacterial infections by bringing the compounds of this invention into contact with the site of such bacterial infection.

More specifically, the compounds of this invention are those defined by the following structural formula

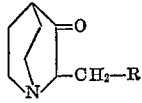

where R is an amine selected from the group consisting of

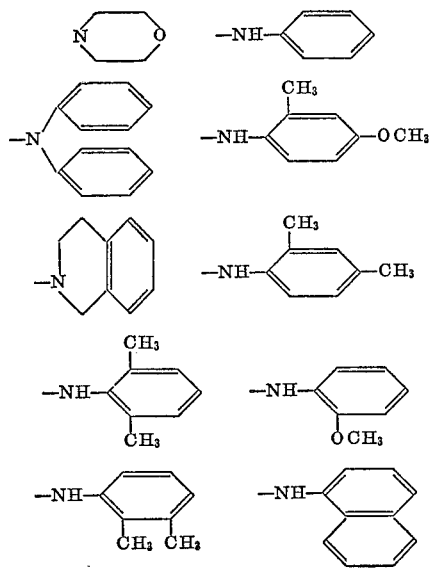

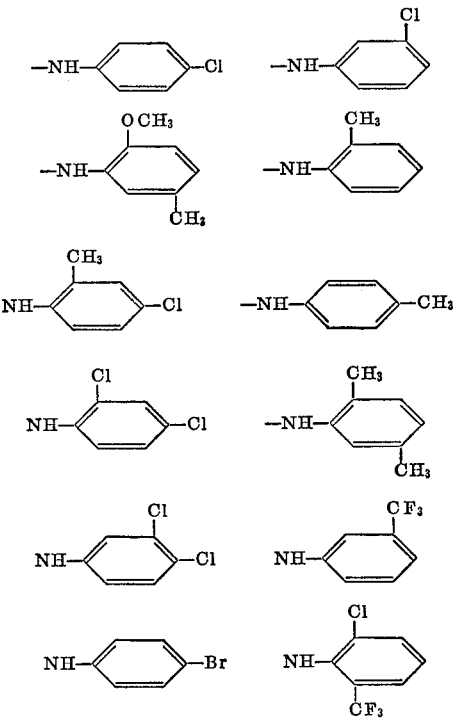

Within the foregoing structural formula, certain groups of compounds may be identified as useful in accordance with the present invention. These include the secondary amine substituted 2-methylene-3-quinuclidones where the amine substituent is a naphthalene or substituted benzene compound, in which the benzene may be substituted at less than three positions and the benzene substituents are selected from the group consisting of lower alkyls, or lower alkoxies, trifluoro methyl, chlorides and bromides.

Another group of compounds within the foregoing structural formula useful in the present invention are those teriary amine-substituted 2-methylene-3-quinuclidones in which the amine substituent is a heterocyclic moiety including and bonded through the nitrogen atom of the amine group.

Compounds within the foregoing groups and certain other compounds similar thereto, may be synthesized as follows:

PREPARATION OF 2-(MORPHOLINOMETHYL)-3-QUINUCLIDONE (HS-7)

Method 1: Into a flask equipped with a stirrer were added 1.29 gm. (.015 mole) of morpholine and 1.0 gm. (.0074 mole) of 2-methylene-3-quinuclidone. After an initial exotherm to 45° C. occurred, the reaction mixture was stirred for 24 hours at room temperature at the end of which, a white precipitate separated from solution. This was filtered to give a total yield of 1.40 gm. (84.5%) of crude 2-(morpholinomethyl)-3-quinuclidone. Recrystallization from isopropanol gave 1.15 gm. of white precipitate (M.P. 108°–110° C.).

Infrared: Carbonyl, 5.85 microns.

Analysis.—Calcd. for $C_{12}H_{20}N_2O_2$ (percent): C, 64.29; H, 8.94; N, 12.50. Found (percent): C, 64.18; H, 8.98; N, 12.27.

Method 2: Into a flask equipped with a stirrer and reflux condenser were added 3.43 gm. (.025 mole) of 3-quinuclidone, 9.74 gm. (.05 mole) of 37% aqueous formaldehyde, 4.33 gm. (.05 mole) of morpholine and 10 ml. of water. The reaction mixture was refluxed for 24 hours at 100° C. and allowed to cool to room temperature. Solvent and excess reagents were evaporated in vacuo and the residue was fractionally distilled to provide 3.2 gm. (57.2%) of 2-(morpholinomethyl)-3-quinuclidone as an orange oil, B.P. 85–105° C. (6 mm.). The oil was permitted to stand for several hours during which it solidified. Upon recrystallization from isopropanol, the resulting white precipitate was identical with regard to infrared spectrum and melting point when compared to 2 - (morpholinomethyl) - 3 - quinuclidone prepared by method 1. A mixed melting point of samples prepared by the two methods showed no depression.

PREPARATION OF 2-(DIPHENYLAMINO-METHYL)-3-QUINUCLIDONE (HS-13)

Into a flask equipped with a stirrer were added 1.0 gram (hereafter g.) (.0074 mole, hereafter m.) of 2-methylene-3-quinuclidone and 2.5 g. (.0148 m.) of diphenylamine. After the initial exotherm to 38° C., stirring of the reaction mixture was continued for 36 hours at room temperature. At the end of this time period, a creamy colored precipitate had formed. This was filtered and dried in a vacuum dessicator to give a total yield of 1.72 g. (75.5%) of crude 2-(diphenylaminomethyl)-3-quinuclidone. Recrystallization from absolute ethanol gave 1.45 g. of ivory colored precipitate (M.P. 101–103° C.), having the following properties:

Infrared: Carbonyl, 5.85 micron; aromatic unsaturation, 6.25 microns.

Calculated atomic proportion for $C_{20}H_{22}N_2O$ (percent): C, 78.43; H, 7.20; N, 9.15.

Atomic proportion (percent): C, 78.31; H, 7.59; N, 8.99.

PREPARATION OF 2 - [(1,2,3,4 - TETRAHYDRO-ISOQUINILINO)METHYL] - 3 - QUINUCLIDONE (HS-21)

Into a flask equipped with a stirrer were added 0.5 g. (.0037 m.) of 2-methylene-3-quinuclidone and 1.0 g. (.0073 m.) of 1,2,3,4-tetrahydroisoquinoline. After the initial exotherm to 40° C., stirring of the reaction mixture was continued for 21 hours at room temperature. At the end of this time, approximately 5 ml. of petroleum ether (B.P. 30–70° C.) were added and the entire mixture was placed in an ice bath. The resulting white precipitate which formed was filtered and afforded a total yield of 0.82 g. (80.9%) of crude 2-[(1,2,3,4-tetrahydroisoquinolino)methyl] - 3 - quinuclidone. Several recrystallizations from petroleum ether gave 0.66 g. of white precipitate (M.P. 84–86° C.).

Infrared: Carbonyl, 5.85 microns; aromatic unsaturation, 6.3 and 6.7 microns.

Calculated atomic proportion for $C_{17}H_{22}N_2O$ (percent): C, 75.58; H, 8.15; N, 10.38.

Atomic proportion (percent): C, 75.57; H, 8.42; N, 10.66.

PREPARATION OF 2-(ANILINOMETHYL) 3-QUINUCLIDONE (HS-30)

Into a flask equipped with a stirrer was placed a solution of 0.50 g. (.0054 m.) of aniline in 4 ml. of methanol To this solution, 0.74 g. (.0054 m.) of 2-methylene-3-quinuclidone dissolved in 4 ml. of water, was added dropwise. The resulting reaction mixture was stirred for 4 hours at room temperature. At the end of this time, a white precipitate had formed. The resulting precipitate was filtered to give a total yield of 0.93 g. (75.0%) of crude 2-(anilinomethyl)-3-quinuclidone. Recrystallization from benzene and petroleum ether yielded 0.84 g. of white precipitate (M.P. 93–95° C.).

Infrared: Carbonyl, 5.8 microns; aromatic unsaturation, 6.3 and 6.7 microns.

Calculated atomic proportion for $C_{14}H_{18}N_2O$ (percent): C, 73.10; H, 7.82; N, 12.20.

Atomic proportion (percent): C, 72.81; H, 8.05; N, 12.04.

PREPARATION OF 2-[(2,3-DIMETHYLANILINO) METHYL]-3-QUINUCLIDONE (HS-32)

Into a flask equipped with a stirrer was placed a solution of 0.44 g. (.0037 m.) of 2,3-dimethylaniline in 3 ml. of methanol. To this solution, 0.5 g. (.0037 mole) of 2-methylene-3-quinuclidone dissolved in 4 ml. of water was added dropwise. The resulting reaction mixture was stirred for 16 hours at room temperature. At the end of this time, the white precipitate which had formed was filtered to give a total yield of 0.72 g. (73.1%) of crude 2-[(2,3-dimethylanilino)methyl]-3-quinuclidone. Several recrystallizations from methanol, utilizing small amounts of activated charcoal as a decolorizing agent, afforded 0.5 g. of a white precipitate (M.P. 110–113° C.).

Infrared: Carbonyl, 5.85 microns; aromatic unsaturation, 6.25 and 6.75 microns.

Calculated atomic proportion for $C_{11}H_{22}N_2O$ (percent): C, 74.50; H, 8.53; N, 10.87.

Atomic proportion (percent): C, 74.45; H, 8.52; N, 11.07.

PREPARATION OF 2-[(2-METHYL - 4 - METHOXY-ANILINO)METHYL]-3-QUINUCLIDONE (HS-33)

Into a flask equipped with a stirrer was placed a solution of 0.50 g. (.0037 mole) of 4-methoxy-2-methylaniline in 3 ml. of methanol. To this solution, 0.5 g. (.0037 m.) of 2-methylene-3-quinuclidone dissolved in 4 ml. of water was added dropwise. The resulting reaction mixture was stirred for 16 hours at room temperature. At the end of this time, the white precipitate which had formed was filtered to give a total yield of 0.81 g. (79.6%) of crude 2-[(2-methyl-4-methoxyanilino)methyl] - 3 - quinuclidone. Recrystallization from methanol afforded 0.64 g. of a white precipitate (M.P. 97–99° C.).

Infrared: Carbonyl, 5.85 microns; aromatic unsaturation, 6.3 and 6.7 microns.

Calculated atomic proportion for $C_{16}H_{22}N_2O_2$: (percent): C, 70.16; H, 8.04; N, 10.21.

Atomic proportion (percent): C, 70.34; H, 8.32; N, 10.34.

Preparation of 2-[(2-methoxyanilino)methyl]-3-quinuclidone (HS-34)

Into a flask equipped with a stirrer was placed a solution of 0.44 g. (.0037 m.) of 2-methoxyaniline (o-anisidine) in 3 ml. of methanol. To this solution, 0.5 g. (0.0037 m.) of 2-methylene-3-quinuclidone dissolved in 4 ml. of water was added dropwise. The reaction mixture was stirred for 48 hours at room temperature and a milky solution resulted. Approximately 5 ml. of methanol were added to the milky solution and it was warmed until clarity was obtained. The clear solution was then allowed to stand at room temperature for 24 hours. At the end of this time, the white precipitate which had formed was filtered to give a total yield of 0.48 g. (50.0%) of crude 2-[(2-methoxyanilino)methyl]-3-quinuclidone. Recrystallization from methanol afforded .36 g. of a white precipitate (M.P. 135–138° C.).

Infrared: Carbonyl, 5.8 microns; aromatic unsaturation, 6.3 and 6.75 microns.

Calculated atomic proportion for $C_{15}H_{17}N_2O_2$: C, 69.32; H, 7.70; N, 10.79.

Atomic proportion (percent): C, 69.12; H, 7.75; N, 10.91.

PREPARATION OF 2-[(2,4-DIMETHYLANILINO)] METHYL-3-QUINUCLIDONE (HS-35)

Into a flask equipped with a stirrer was placed a solution of 0.44 g. (.0037 m.) of 2,4-dimethylaniline in 3 ml. of methanol. To this solution, 0.5 g. (.0037 m.) of 2-methylene-3-quinuclidone dissolved in 4 ml. of water was added dropwise. The reaction mixture was stirred for 48 hours at room temperature and a milky solution resulted. Ten ml. of methanol were added to the solution and it was warmed until clarity was obtained. The clear solution was then allowed to stand at room temperature for 24 hours. At the end of this time, the white precipitate which had formed was filtered to give a total yield of 0.82 g. (85.5%) of crude 2-[(2,4-dimethylanilino)methyl]-3-quinuclidone. Recrystallization from methanol afforded 0.76 g. of a white precipitate (M.P. 129–131° C.).

Infrared: Carbonyl, 5.9 microns; aromatic unsaturation, 6.3 and 6.7 microns.

Calculated atomic proportion for $C_{16}H_{22}N_2O$: C, 74.50; H, 8.53; N, 10.87.

Atomic proportion (percent): C, 74.49; H, 8.60; N, 11.12.

PREPARATION OF 2-(MORPHOLINOMETHYL)-3-QUINUCLIDINOL (HS–54)

Into a flask equipped with a stirrer was placed a solution of 0.90 g. (.004 m.) of 2-(morpholinomethyl)-3-quinuclidone in 10 ml. of methanol. To this solution, 0.076 g. (.002 m.) of sodium borohydride dissolved in 5 ml. of methanol was added dropwise. After a strong exotherm, the reaction mixture was stirred for 24 hours at room temperature. The solution was then concentrated to dryness and 10 ml. of distilled water were added to hydrolyze excess sodium borohydride reagent. The resulting clear solution was extracted three times with 10 ml. portions of anhydrous ether. The combined ethereal extracts were evaporated to dryness to yield 0.80 g. (88.8%) of crude 2-(morpholinomethyl)-3-quinuclidinol. Recrystallization from ethanol and benzene afforded 0.75 g. of a white powder (M.P. 105–120° C.).

Infrared: Hydroxyl, 3.1 microns (broad); carbonyl, none.

Calculated atomic proportion for $C_{12}H_{22}N_2O_2$: C, 63.72; H, 9.73; N, 12.39.

Atomic proportion (percent): C, 63.70; H, 9.82; N, 12.14.

PREPARATION OF 2-[(2,6-DIMETHYLANILINO)METHYL]-3-QUINUCLIDONE (HS–63)

Into a flask equipped with a stirrer was placed a solution of 0.88 g. (.00728 m.) of 2,6-dimethylaniline in 6 ml. of methanol. To this solution, 1.0 g. (.0074 m.) of 2-methylene-3-quinuclidone dissolved in 4 ml. of water was added dropwise. The reaction mixture was stirred for 2 hours at room temperature. At the end of this time period, a white precipitate had formed. This was filtered to give a total yield of 1.60 g. (85.2%) of crude 2-[(2,6-dimethylanilino)methyl] - 3 - quinuclidone. Recrystallization from methanol afforded 1.42 g. of a white precipitate (M.P. 134–137° C.).

Infrared: Carbonyl, 5.85 microns; aromatic unsaturation, 6.3 and 6.7 microns.

Calculated atomic proportion for $C_{16}H_{22}N_2O$: C, 74.50; H, 8.53; N, 10.87.

Atomic proportion (percent): C, 74.57; H, 8.64; N, 11.11.

PREPARATION OF 2-[(2,6-DIMETHYLANILINO)METHYL]-3-QUINUCLIDINOL (HS–66)

Into a flask equipped with a stirrer was placed a slurry of 0.40 g. (0.0016 m.) of 2-[(2,6-dimethylanilino)methyl]-3-quinuclidone in 20 ml. of methanol. To the slurry, 0.003 g. (.0008 m.) of sodium borohydride dissolved in 5 ml. of methanol was added dropwise. After a strong exotherm, the reaction mixture was stirred for 24 hours at room temperature at the end of which, a clear solution remained. The solution was then concentrated to dryness and 10 ml. of distilled water were added to hydrolyze excess sodium borohydride reagent. The non-water soluble precipitate was then filtered to yield 0.36 g. (87.9%) of crude 2-[(2,6-dimethylanilino)methyl]-3-quinuclidinol. Recrystallization from methanol afforded 0.28 g. of a white powder (M.P. 115–143° C.).

Infrared: Hydroxyl, 3.1 microns (broad); carbonyl (none); aromatic unsaturation, 6.25 and 6.75 microns.

Calculated atomic proportion for $C_{16}H_{23}N_2O$: C, 73.85; H, 9.23; N, 10.77.

Atomic proportion (percent): C, 72.94; H, 9.01; N, 10.46.

PREPARATION OF 2 - [(3 - CHLORANILINO)METHYL]-3-QUINUCLIDONE (HS–70)

Into a flask equipped with a stirrer was placed a solution of 0.72 g. (.0056 m.) of 3-chloroaniline in 3 ml. of methanol. To this solution, 0.75 g. (.0056 m.) of 2-methylene-3-quinuclidone dissolved in 2 ml. of water was added dropwise. The reaction mixture was stirred for 2 hours at room temperature and a milky solution resulted. Five ml. of methanol were added to the solution and it was warmed until clarity was obtained. The clear solution was then allowed to stand at room temperature for 12 hours. At the end of this time, the white precipitate which had formed was filtered to give a total yield of 1.20 g. (81.2%) of crude 2-[(3-chloroanilino)methyl]-3-quinuclidone. Recrystallization from methanol afforded 0.98 g. of a white precipitate (M.P. 113–116° C.).

Infrared: Carbonyl, 5.85 microns; aromatic unsaturation, 6.3 and 6.75 microns.

Calculated atomic proportion for $C_{14}H_{17}N_2OCl$: C, 63.50; H, 6.42; N, 10.60.

Atomic proportion (percent): C, 63.54; H, 6.33; N, 10.58.

PREPARATION OF 2-[(2-METHOXY-5-METHYL-ANILINO)]METHYL-3-QUINUCLIDONE(HS–71)

Into a flask equipped with a stirrer was placed a solution of 0.77 g. (.0056 m.) of 2 methoxy-5-methylaniline in 15 ml. of methanol. To this solution, 0.75 g. (.0056 m.) of 2-methylene-3-quinuclidone dissolved in 2 ml. of water was added dropwise. The resulting reaction mixture was stirred for 24 hours at room temperature. At the end of this time, the tan precipitate which had formed was filtered to give a total yield of 0.61 g. (54.6%) of crude 2-[(2-methoxy-5-methylanilino)methyl]-3-quinuclidone. Recrystallization from methanol afforded 0.46 g. of a tan precipitate (M.P. 118–122° C.).

Infrared: Carbonyl, 5.85 microns; aromatic unsaturation, 6.3 and 6.7 microns.

Calculated atomic proportion for $C_{16}H_{22}N_2O_2$: C, 70.16; H, 8.04; N, 10.21.

Atomic proportion (percent): C, 70.13; H, 8.20; N, 9.90.

PREPARATION OF 2-[(4-CHLOROANILINO)METHYL]-3-QUINUCLIDONE (HS–72)

Into a flask equipped with a stirrer was placed a solution of 0.72 g. (.0056 m.) of 4-chloroaniline in 7 ml. of methanol. To this solution, 0.75 g. (.0056 m.) of 2-methylene-3-quinuclidone dissolved in 2 ml. of water was added dropwise. The resulting reaction mixture was stirred for 4 hours at room temperature. At the end of this time, the white precipitate which had formed was filtered to give a total yield of 1.26 g. (81.4%) of crude 2-[(4-chloroanilino)methyl] - 3 - quinuclidone. Recrystallization from methanol afforded 1.00 g. of a white precipitate (M.P. 127–131° C.).

Infrared: Carbonyl, 5.85 microns; aromatic unsaturation, 6.3 and 6.75 microns.

Calculated atomic proportion for $C_{14}H_{17}N_2OCl$: C, 63,50; H, 6.42; N, 10.60.

Atomic proportion (percent): C, 63.27; H, 6.64; N, 10.39.

PREPARATION OF 2-[(3-NITROANILINO)METHYL]-3-QUINUCLIDONE (HS–73)

Into a flask equipped with a stirred was placed a mixture of 0.78 g. (.0056 m.) of 3-nitroaniline in 20 ml. of methanol. The slurry was warmed in a water bath to effect solution. To this solution, 0.75 g. (.0056 m.) of 2- methylene-3-quinuclidone dissolved in 2 ml. of water was added dropwise. The resulting reaction mixture was stirred for 12 hours at 70° C. and then allowed to cool to room temperature. After refrigeration for 4 hours, a light yellow precipitate formed. This was filtered to give a total yield of 1.40 g. (91.0%) of crude 2-[(3-nitroaniline) methyl]-3-quinuclidone. Recrystallization from methanol afforded 1.28 g. of a golden yellow precipitate (M.P. 108–111° C.).

Infrared: Carbonyl, 5.85 microns; aromatic unsaturation, 6.3 and 6.75 microns.

Calculated atomic proportion for $C_{14}H_{17}N_3O_3$: C, 61.09; H, 6.18; N, 15.30.

Atomic proportion (percent): C, 60.88; H, 6.41; N, 15.12.

PREPARATION OF 2-[(3-CHLOROANILINO) METHYL]-3-QUINUCLIDONE (HS–77)

Into a flask equipped with a stirrer was placed a slurry of 0.5 g. (0.002 m.) of 2-[(3-chloroanilino)methyl]-3-quinuclidone in 15 ml. of methanol. To the slurry, 0.038 g. (0.001 m.) of sodium borohydride dissolved in 5 ml. of methanol was added dropwise. After a strong exotherm, the reaction mixture was stirred for 24 hours at room temperature at the end of which, a clear solution remained. The solution was then concentrated to dryness and 10 ml. of distilled water were added to hydrolyze excess sodium borohydride reagent. The non-water soluble precipitate was then filtered to yield 0.42 g. (79.3%) of crude 2 - [(3-chloroanilino)methyl]-3-quinuclidinol. Recrystallization from methanol afforded 0.59 g. of a white powder (M.P. 165–169° C.).

Infrared: Hydroxyl, 3.1 microns (broad); carbonyl, none; aromatic unsaturation, 6.3 and 6.7 microns.

Calculated atomic proportion for $C_{14}H_{19}N_2OCl$: C, 63.04; H, 7.13; N, 10.50.

Atomic proportion (percent): C, 62.88; H, 7.06; N, 10.54.

PREPARATION OF 2-[(1-NAPHTHYLAMINO) METHYL]-3-QUINUCLIDONE (HS–78)

Into a flask equipped with a stirrer was placed a solution of 0.77 g. (.0054 m.) of 1-naphthylamine in 5 ml. of methanol. To this solution, 0.74 g. (.0054 m.) of 2-methylene-3-quinuclidone dissolved in 2 ml. of water was added dropwise. The reaction mixture was stirred for 4 hours at room temperature. At the end of this time, the purple precipitate which had formed was filtered to give a total yield of 1.45 g. (96.0%) of crude 2-[(1-naphthylamino) methyl]-3-quinuclidone. Recrystallization from methanol afforded 1.31 g. of a purple precipitate (M.P. 159–163° C.).

Infrared: Carbonyl, 5.9 microns; aromatic unsaturation, 6.3 and 6.7 microns.

Calculated atomic proportion for $C_{18}H_{20}N_2O$: C, 77.15; H, 7.15; N. 10.00.

Atomic proportion (percent): C, 77.14; H, 7.23; N, 9.72.

PREPARATION OF 2-[2-METHYL-4-CHLOROANILINO)METHYL]-3-QUINUCLIDONE (HS–88)

Into a flask equipped with a stirrer was placed a solution of 0.76 g. (.0054 m.) of 4-chloro-2-methylaniline in 5 ml. of methanol. To this solution, 0.74 g. (.0054 ml) of 2-methylene-3-quinuclidone dissolved in 2 ml. of water was added dropwise. The reaction mixture was stirred for 48 hours at room temperature. At the end of this time, the white precipitate which had formed was filtered to give a total yield of 1.31 g. (87.4%) of crude 2-[(4-chloro-2-methylanilino)methyl]-3-quinuclidone. Recrystallization from methanol afforded 1.16 g. of a white precipitate (M.P. 122–125° C.).

Infrared: Carbonyl, 5.85 microns; aromatic unsaturation, 6.25 and 6.75 microns.

Calculated atomic proportion for $C_{15}H_{19}N_2OCl$: C, 64.50; H, 6.82; N, 10.50.

Atomic proportion (percent): C, 64.54; H, 6.72; N, 10.49.

PREPARATION OF 2-[(3-TRIFLUOROMETHYLANILINO)METHYL]-3-QUINUCLIDONE (HS–89)

Into a flask equipped with a stirrer was placed a solution of 0.87 g. (.0054 m.) of 3-trifluoromethylaniline in 5 ml. of methanol. To this solution, 0.74 g. (0.0054 m.) of 2 - methylene - 3 - quinuclidone dissolved in 2 ml. of water was added dropwise. The reaction mixture was stirred for 4 hours at room temperature and a milky solution resulted. Ten ml. of methanol were added to the solution and it was warmed until clarity was obtained. The clear solution was then allowed to stand at room temperature for 24 hours. At the end of this time, the white precipitate which had formed was filtered to give a total yield of 1.35 g. (83.8%) of crude 2-[(3-trifluoromethylanilino) methyl] - 3 - quinuclidone. Recrystallization from methanol afforded 1.21 g. of a white precipitate (M.P. 121–122° C.).

Infrared: Carbonyl, 5.85 microns; aromatic unsaturation, 6.25 and 6.7 microns.

Calculated atomic proportion for $C_{15}H_{17}N_2OF_3$: C, 60.40; H, 5.71; N, 9.45.

Atomic proportion (percent): C, 60.35; H, 5.63; N, 9.68.

PREPARATION OF 2 - [(2 - CHLORO - 5 - TRIFLUOROMETHYLANILINO)METHYL] - 3 - QUINUCLIDONE (HS–90)

Into a flask equipped with a stirrer was placed a solution of 1.06 g. (0.0054 m.) of 2 - chloro - 5 - trifluoromethylaniline in 5 ml. of methanol. To this solution, 0.74 g. (0.0054 m.) of 2 - methylene - 3 - quinuclidone dissolved in 2 ml. of water was added dropwise. The reaction mixture was stirred for 8 hours at room temperature. At the end of this time, the white precipitate which had formed was filtered to give a total yield of 1.54 g. (85.5%) of crude 2-[(2-chloro-5-trifluoromethylanilino)methyl]-3-quinuclidone. Recrystallization from methanol afforded 1.37 g. of a white precipitate (M.P. 135–138° C.).

Infrared: Carbonyl, 5.85 microns; aromatic unsaturation, 6.25 and 6.75 microns.

Calculated atomic proportion for $C_{15}H_{16}N_2OClF_3$: C, 54.15; H, 4.78; N, 8.42.

Atomic proportion (percent): C, 53.94; H, 4.66; N, 8.54.

PREPARATION OF 2 - [(2,4 - DICHLOROANILINO) METHYL] - 3 - QUINUCLIDONE (HS–92)

Into a flask equipped with a stirrer was placed a solution of 0.88 g. (0.0054 m.) of 2,4 - dichloroaniline in 5 ml. of methanol. To this solution, 0.74 g. (0.0054 m.) of 2 - methylene - 3 - quinuclidone dissolved in 2 ml. of water was added dropwise. The reaction mixture was stirred for 8 hours at room temperature. At the end of this time, the white precipitate which had formed was filtered to give a total yield of 1.48 g. (91.5%) of crude 2-[(2,4-dichloroanilino)methyl] - 3 - quinuclidone. Recrystallization from methanol afforded 1.21 g. of a white precipitate (M.P. 110–113° C.).

Infrared: Carbonyl, 5.75 microns; aromatic unsaturation, 6.2 and 6.75 microns.

Calculated atomic proportion for $C_{14}H_{16}N_2OCl_2$: C, 56.19; H, 5.35; N, 9.36.

Atomic proportion (percent): C, 55.66; H, 5.42; N, 9.67.

PREPARATION OF 2 - [(3 - DICHLOROANILINO) METHYL] - 3 - QUINUCLIDONE (HS–93)

Into a flask equipped with a stirrer was placed a solution of 0.88 g. (0.0054 m.) of 3,4 - dichloroaniline in 5 ml. of methanol. To this solution, 0.74 g. (0.0054 m.)

of 2 - methylene - 3 - quinuclidone dissolved in 2 ml. of water was added dropwise. The reaction mixture was stirred for 8 hours at room temperature. At the end of this time, the white precipitate which had formed was filtered to give a total yield of 1.36 g. (84.0%) of crude 2-[(3,4-dichloroanilino)methyl] - 3 - quinuclidone. Recrystallization from methanol afforded 1.18 g. of a white precipitate (M.P. 123–127° C.).

Infrared: Carbonyl, 5.9 microns; aromatic unsaturation, 6.25 and 6.75 microns.

Calculated atomic proportion for $C_{14}H_{16}N_2OCl_2$: C, 56.19; H, 5.35; N, 9.36.

Atomic proportion (percent): C, 55.54; H, 5.12; N, 9.49.

PREPARATION OF N,N - BIS(METHYLENE-2-QUINUCLID - 3 - ONE)METHYLAMINE (HS–99)

Into a flask equipped with a stirrer was placed a solution of 1.16 g. (0.015 m.) of a 40% aqueous solution of methylamine. To this solution, 4.3 g. (0.03 m.) of 2-methylene - 3 - quinuclidone dissolved in 3 ml. of water was added dropwise. The reaction mixture was heated at 70° C. for 8 hours and then concentrated to a solid wax which represented a total yield of 4.11 g. (84.7%) of crude N,N - bis(methylene - 2 - quinuclid - 3 - one) methylamine. Recrystallization from benzene afforded 3.75 g. of a white precipitate (M.P. 88–90° C.), which gave elemental analysis corresponding to the monohydrate.

Infrared: Hydroxyl, 2.8 microns; carbonyl, 5.85 microns.

Calculated atomic proportion for $C_{17}H_{29}N_3O_3$: C, 63.16; H, 8.99; N, 13.00.

Atomic proportion (percent): C, 62.73; H, 8.72; N, 13.06.

PREPARATION OF 2 - [(4 - NITROANILINO) METHYL] - 3 - QUINUCLIDONE (HS–102)

Into a flask equipped with a stirrer was placed a solution of 0.55 g. (0.0037 m.) of 4-nitroaniline in 15 ml. of methanol. This solution was gently warmed until clear. To this warm solution, 0.5 g. (0.0037 m.) of 2-methylene-3-quinuclidone dissolved in 2 ml. of water was added dropwise. The reaction mixture was then stirred for 8 hours at room temperature. At the end of this time, the yellow precipitate which had formed was filtered to give a total yield of 0.84 g. (84.1%) of crude 2-[(4-nitroaniline)methyl]-3-quinuclidone. Recrystallization from methanol afforded 0.71 g. of a golden yellow precipitate (M.P. 160–163° C.).

Infrared: Carbonyl, 5.85 microns; aromatic unsaturation, 6.25 and 6.7 microns.

Calculated atomic proportion for $C_{14}H_{17}N_3O_3$: C, 61.09; H, 6.19; N, 15.28.

Atomic proportion (percent): C, 61.08; H, 6.06; N, 15.06.

PREPARATION OF 2 - [(2 - NITROANILINO) METHYL] - 3 - QUINUCLIDONE (HS–103)

Into a flask equipped with a stirrer was placed a solution of 0.55 g. (0.0037 m.) of 2 - nitroaniline in 15 ml. of methanol. This solution was gently warmed until clear. To this warm solution, 0.5 g. (0.0037 m.) of 2-methylene-3-quinuclidone dissolved in 2 ml. of water was added dropwise. The reaction mixture was then stirred for 8 hours at room temperature. At the end of this time, the yellow precipitate which had formed was filtered to give a total yield of 0.79 g. (79.0%) of crude 2-[(2-nitroaniline)methyl]-3-quinuclidone. Recrystallization from methanol afforded 0.68 g. of a golden yellow precipitate (M.P. 165–167° C.). Infrared: Carbonyl, 5.85 microns; aromatic unsaturation, 6.25 and 6.7 microns.

Calculated atomic proportion for $C_{14}H_{17}N_3O_3$: C, 61.09; H, 6.19; N, 15.28.

Atomic proportion (percent): C, 61.33; H, 6.17; N, 15.20.

PREPARATION OF 2-[(4-BROMOANILINO) METHYL]-3-QUINUCLIDONE (HS–104)

Into a flask equipped with a stirrer was placed a solution of 0.69 g. (0.0037 m.) of 4-bromoaniline in 5 ml. of methanol. To this solution, 0.5 g. (0.0037 m.) of 2-methylene-3-quinuclidone dissolved in 2 ml. of water was added dropwise. The reaction mixture was then stirred for 4 hours at room temperature. At the end of this time, the white precipitate which had formed was filtered to give a total yield of 1.00 g. (87.0%) of crude 2-[(4-bromoanilino)methyl] - 3 - quinuclidone. Recrystallization from methanol afforded 0.86 g. of a white precipitate (M.P. 131–135° C.).

Infrared: Carbonyl, 5.85 microns; aromatic unsaturation, 6.25 and 6.75 microns.

Calculated atomic proportion for $C_{14}H_{17}N_2OBr$: C, 54.37; H, 5.50; N, 9.06.

Atomic proportion (percent): C, 54.22; H, 5.36; N, 8.96.

PREPARATION OF 2-[(2-METHYLANILINO) METHYL]-3-QUINUCLIDONE (HS–105)

Into a flask equipped with a stirrer was placed a solution of 0.43 g. (0.0037 m.) of 2-methylaniline in 5 ml. of methanol. To this solution, 0.5 g. (0.0037 m.) of 2-methylene-3-quinuclidone dissolved in 2 ml. of water was added dropwise. The reaction mixture was then stirred for 2 hours at room temperature and a milky solution resulted. Ten ml. of methanol were added and the solution was warmed until clear. The solution was then allowed to stand at room temperature for 24 hours. At the end of this time, the white precipitate which had formed was filtered to give a total yield of 0.60 g. (66.7%) of crude 2-[(2-methylanilino)methyl]-3-quinuclidone. Recrystallization from methanol afforded 0.52 g. of a white precipitate (M.P. 126–128° C.).

Infrared: Carbonyl, 5.85 microns; aromatic unsaturation, 6.2 and 6.75 microns.

Calculated atomic proportion for $C_{15}H_{20}N_2O$: C, 73.90; H, 8.20; N, 11.49.

Atomic proportion (percent): C, 73.76; H, 8.36; N, 11.24.

PREPARATION OF 2-[(4-METHYLANILINO) METHYL]-3-QUINUCLIDONE (HS–106)

Into a flask equipped with a stirrer was placed a solution of 0.43 g. (0.0037 m.) of 4-methylaniline in 5 ml. of methanol. To this solution, 0.5 g. (0.0037 m.) of 2-methylene-3-quinuclidone dissolved in 2 ml. of water was added dropwise. The reaction mixture was then stirred for 2 hours at room temperature and a milky solution resulted. Ten ml. of methanol were added and the solution was warmed until clarity resulted. The clear solution was then allowed to stand at room temperature for 24 hours. At the end of this time, the white precipitate which had formed was filtered to give a total yield of 0.65 g. (72.2%) of crude 2-[(4-methylanilino)methyl]-3-quinuclidone. Recrystallization from methanol afforded 0.49 g. of a white precipitate (M.P. 133–135° C.).

Infrared: Carbonyl, 5.85 microns; aromatic unsaturation, 6.2 and 6.75 microns:

Calculated atomic proportion for $C_{15}H_{20}N_2O$: C, 73.90; H, 8.20; N, 11.49.

Atomic proportion (percent): C, 73.78; H, 8.16; N, 11.23.

PREPARATION OF 2-[(2,5-DIMETHYLANILINO) METHYL]-3-QUINUCLIDONE (HS–108)

Into a flask equipped with a stirrer was placed a solution of 0.48 g. (0.0037 m.) of 2,5-dimethylaniline in 5 ml. of methanol. To this solution, 0.5 g. (0.0037 m.) of 2-methylene-3-quinuclidone dissolved in 2 ml. of water was added dropwise. The reaction mixture was then stirred for 12 hours at room temperature. At the end of this time, the white precipitate which had formed was filtered to give a total yield of 0.72 g. (75.0%) of crude 2-[(2,5-dimethylanilino)methyl]-3-quinuclidone. Recrystallization from methanol afforded 0.61 g. of a white precipitate (M.P. 136–137° C.).

Infrared: Carbonyl, 5.85 microns; aromatic unsaturation, 6.25 and 6.75 microns.

Calculated atomic proportion for $C_{16}H_{22}N_2O$: C, 74.42; H, 8.53; N, 10.85.

Atomic proportion (percent): C, 74.19; H, 8.34; N, 10.77.

Chemotherapeutic evaluation was carried out with several of the previously described Mannich bases of 3-quinuclidone. As a result of the poor water solubility of those compounds possessing an aromatic nucleus in the side chain, such compounds were converted to the water soluble dihydrochloride salts and were utilized in this state for the evaluation.

The method of evaluation consisted of a disk assay test employing the following organisms: *Pseudomonas aeruginosa*, *Escherichia coli*, *Staphylococcus aureus*, *Proteus vulgaris*, and *Streptococcus pyogenes*. All organisms ultilized were obtained from the culture collection of the Department of Microbiology, Temple University School of Pharmacy. All compounds were tested as aqueous solutions of the free base or dihydrochloride salts as indicated.

TEST PROCEDURE

Petri dishes coated with nutrient agar (brain heart infusion agar in the case of *Streptococcus pyogenes*) were streaked by means of a dolly rod wtih 0.1 ml. of a 24 hour culture of the above-mentioned microorganisms. Antibiotic assay discs (6 mm. diameter) were then dipped in aqueous solutions of the antibacterial agent, placed on a dry petri dish for 60 seconds to remove excess liquid, and then placed on the agar plates. Two compounds were tested in duplicate on each plate. All plates were incubated at 37° C. for 24 hours. Results were tabulated in terms of zones of inhibition in millimeters. In each series of tests, a water control was utilized. All reported zones of inhibition represented the average of duplicate tests.

In the first series of compounds evaluated (listed in Table I), all test solutions were prepared in a concentration of 150 milligrams per milliliter. In addition to five Mannich bases (HS-7, HS-21, HS-30, HS-32, HS-33), 3-quinuclidone (HL-1), 3-quinuclidinol (HL-2), spiro-(imidazolidine-4, 3-quinuclidine)-2,5-dione (HL-43) and three reduced alcohol derivatives of the Mannich bases (HS-54, HS-66, HS-77) were tested. With the exception of the Mannich bases, activity was negligible.

The results of this series of tests are tabulated in Table I.

TABLE I.—ANTIBACTERIAL EVALUATION
[Inhibition zone (mm.)]

| Compound | S. aureus | P. aeruginosa | P. vulgaris |
|---|---|---|---|
| HL-1 [1] | 12.5 | 13.0 | (2) |
| HL-2 [1] | Negative | 11.5 | (2) |
| HL-43 [1] | Negative | Negative | Negative |
| HS-7 | 32.5 | 22.0 | (2) |
| HS-30·2HCl | 40.0 | 25.0 | 48.0 |
| HS-21 | 40.0 | 30.0 | 48.0 |
| HS-33·2HCl | 40.0 | 25.0 | 40.0 |
| HS-32·2HCl | 40.0 | 30.0 | 45.0 |
| HS-54 [1] | Negative | Negative | Negative |
| HS-66·2HCl [1] | Negative | Negative | Negative |
| HS-77·2HCl [1] | Negative | Negative | Negative |
| Water | Negative | Negative | Negative |

[1] Not Mannich base of 3-quinuclidone.
[2] Not tested.
NOTE.—Negative=No inhibition (0 mm.).

Another series of tests were then conducted in which the test solutions were prepared in a concentration of 50 milligrams per milliliter. In this series of tests, several additional Mannich bases were evaluated. In order to observe any differences in activity between such bases and their dihydrochloride salts, 2-(morpholino methyl)-3-quinuclidone (HS-7) and its dihydrochloride were both evaluated in this series of tests. Only insignificant differences in activity between these two forms of the same compound were apparent. Results of the tests in this series are tabulated in Table II. It will be noted from Table II that strongly electron-withdrawing substituents such as the nitrophenyl group of HS-73 has an adverse effect on the anti-bacterial properties of these compounds.

TABLE II.—ANTIBACTERIAL EVALUATION
[Inhibition zone (mm.)]

| Compound | S. aureus | E. coli | P. aeruginosa | P. vulgaris | S. pyogenes |
|---|---|---|---|---|---|
| HS-78·2HCl | 30.0 | 26.5 | 16.5 | 32.0 | (1) |
| HS-70·2HCl | 30.0 | 30.0 | 19.5 | 35.0 | 32.0 |
| HS-34·2HCl | Negative | 15.0 | 11.5 | Negative | 3.5 |
| HS-71·2HCl | 11.5 | 12.0 | 14.0 | 15.0 | (1) |
| HS-73·2HCl | Negative | Negative | 8.0 | Negative | Negative |
| HS-92·2HCl | 35.0 | 30.0 | 22.5 | 35.5 | (1) |
| HS-13·2HCl | 30.5 | 26.0 | 15.0 | 32.0 | 28.0 |
| HS-89·2HCl | 32.0 | 28.5 | 16.5 | 34.0 | 31.5 |
| HS-106·2HCl | 30.0 | 29.0 | 21.0 | X | (1) |
| HS-7 | 32.5 | 32.5 | 24.5 | X | (1) |
| HS-7·2HCl | 30.0 | 29.5 | 21.5 | 38.5 | 32.0 |
| HS-104·2HCl | 30.5 | 30.5 | 23.5 | 35.0 | 33.5 |
| HS-21 | 35.0 | 30.0 | 23.0 | 40.0 | 36.5 |
| Water | Negative | Negative | Negative | Negative | Negative |

[1] Not tested.
NOTE.—Negative=No inhibition (0 mm.).

In the third series of compounds evaluated, the most effective materials from the previous two series of tests were compared with the sodium salt of the methane sulfonate derivative of colistin (trade name Coly-Mycin) and sodium amplicillin (trade name Polycillin). All test solutions were prepared in a concentration of 10 milligrams per milliliter. The results of this third series of tests tabulated in Table III.

TABLE III.—ANTIBACTERIAL EVALUATION
[Inhibition zone (mm.)]

| Compound | S. aureus | E. Coli | P. aeruginosa | | S. pyogenes |
|---|---|---|---|---|---|
| Polycillin | 31.0 | 34.0 | 8.0 | 25.0 | (1) |
| Coly-Mycin | 24.0 | 16.0 | 16.0 | 29.0 | 26.5 |
| HS-7 | 25.0 | 29.5 | 14.5 | 20.0 | 29.5 |
| HS-21 | 30.0 | 26.5 | 23.0 | 25.5 | 31.5 |
| HS-104·2HCl | 32.0 | 32.0 | 21.5 | 24.5 | 31.5 |
| HS-92·2HCl | 30.0 | 30.5 | 18.0 | 21.5 | 30.5 |
| HS-30·2HCl | 21.0 | 29.0 | 13.5 | 19.5 | 26.5 |
| Water | Negative | Negative | Negative | Negative | Negative |

[1] Not tested.
NOTE.—Negative=No inhibition (0 mm.).

From these tests it is apparent that a wide variety of secondary and tertiary amine-substituted 2-methylene-3-quinuclidones, which group of compounds has not previously been reported, may be used specifically to inhibit bacterial growth, and generally to treat bacterial infections. To the extent that possible variants of the amine constituents in this group of compounds has been explored, it appears that aromatic groups and halogenated aromatic groups are the species of the present invention having the greatest antibacterial activity. Compounds including nitro-substituted benzene are noticeably less reactive, it is hypothesized that the nitro group tends to withdraw electrons from the aromatic structure of the substituent. Halide groups substituted on the phenyl rings, while they are presumed also to be electron withdrawing, apparently contribute a countervailing beneficial effect by tending to orient incoming reactive groups. In any event halide substituted phenyl substituent compounds are among the more active antibacterial agents of the present invention.

Generally speaking then, while this invention has been described with respect to specific embodiments thereof, it is expected that numerous modifications and embodiments within the true spirit and scope of the present invention will be obvious to those skilled in the art. It is intended therefore that these numerous modifications and embodiments be included within the scope of the appended claims.

What is claimed is:

1.

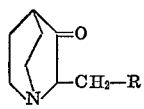

where R is an amine, selected from the group consisting of

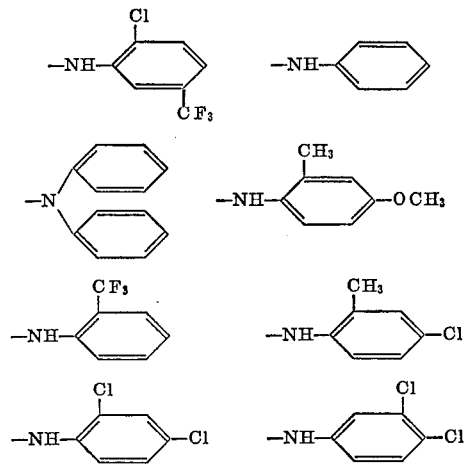

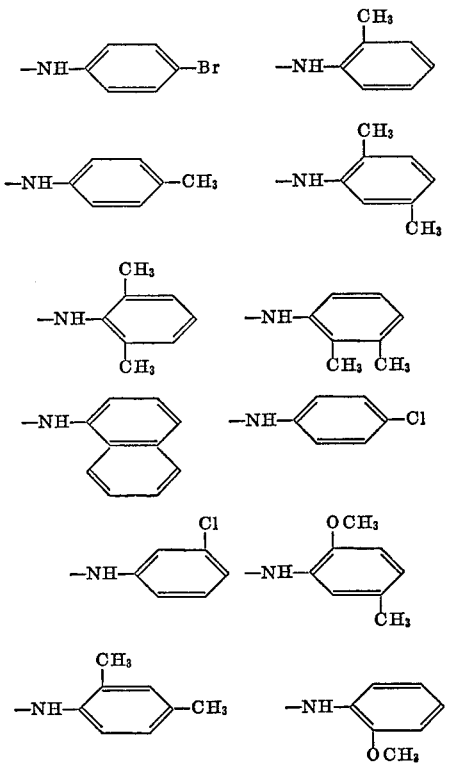

2.

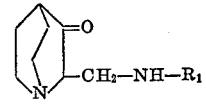

wherein $R_1$ is a substituted benzene compound wherein the benzene compound is substituted at less than three positions thereof and said substituents are selected from the group consisting of lower alkyl, lower alkoxy, trifluoromethyl, chloro and bromo.

References Cited

UNITED STATES PATENTS 3,384,641   5/1968   Biel et al. _____ 260—294.7
3,462,442   8/1969   Biel et al. _____ 260—294

HENRY R. JILES, Primary Examiner
G. T. TODD, Assistant Examiner

U.S. Cl. X.R.

260—247.5 B, 228 R; 424—248, 258, 267

UNITED STATES PATENT OFFICE
CERTIFICATE OF CORRECTION

Patent No. 3,726,877      Dated April 10, 1973

Inventor(s) Samuel Elkin and Hillel Lieberman

It is certified that error appears in the above-identified patent and that said Letters Patent are hereby corrected as shown below:

Column 2, line 29, the last structure on the right in the group of structures in Column 2, change " 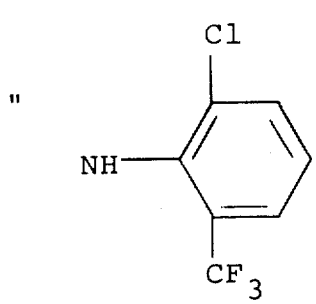 " to --- 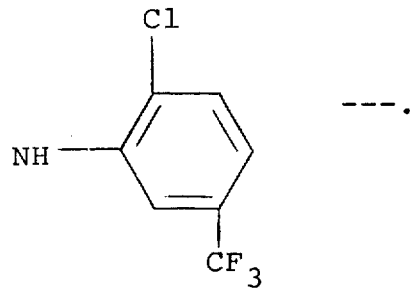 ---.

Column 2, line 42, change "teriary" to --- tertiary ---.

Column 6, line 66, change "63,50" to --- 63.50 ---.

Column 6, line 72, change "stirred" to --- stirrer ---.

Column 7, line 62, change "stirred" to --- stirrer ---.

Column 7, line 64, change "(.0054ml)" to --- (.0054m) ---.

--- continued ---

UNITED STATES PATENT OFFICE
CERTIFICATE OF CORRECTION

Page 2

Patent No. 3,726,877  Dated April 10, 1973

Inventor(s) Samuel Elkin and Hillel Lieberman

It is certified that error appears in the above-identified patent and that said Letters Patent are hereby corrected as shown below:

Column 12, line 61, change "amplicillin" to --- ampicillin ---.

Column 12, Table III, insert --- P. vulgaris --- in the column headings after "P. aeruginosa".

Column 13, line 50, the structure on the left side, second from the bottom, change

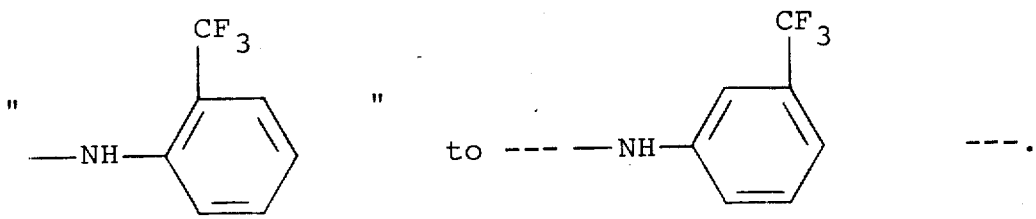

Signed and sealed this 20th day of November 1973.

(SEAL)
Attest:

EDWARD M. FLETCHER, JR.
Attesting Officer

RENE D. TEGTMEYER
Acting Commissioner of Patents